Nov. 14, 1944.     A. J. HUCK     2,362,753
TIMER FOR TOASTERS AND THE LIKE
Filed Dec. 31, 1942     2 Sheets-Sheet 1
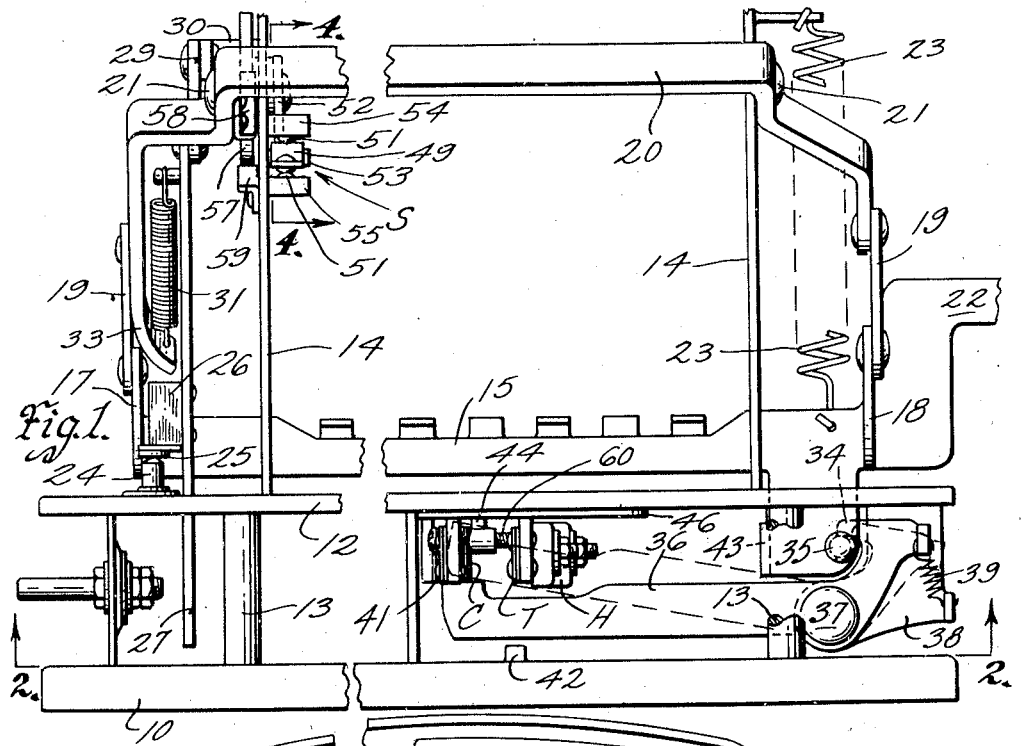
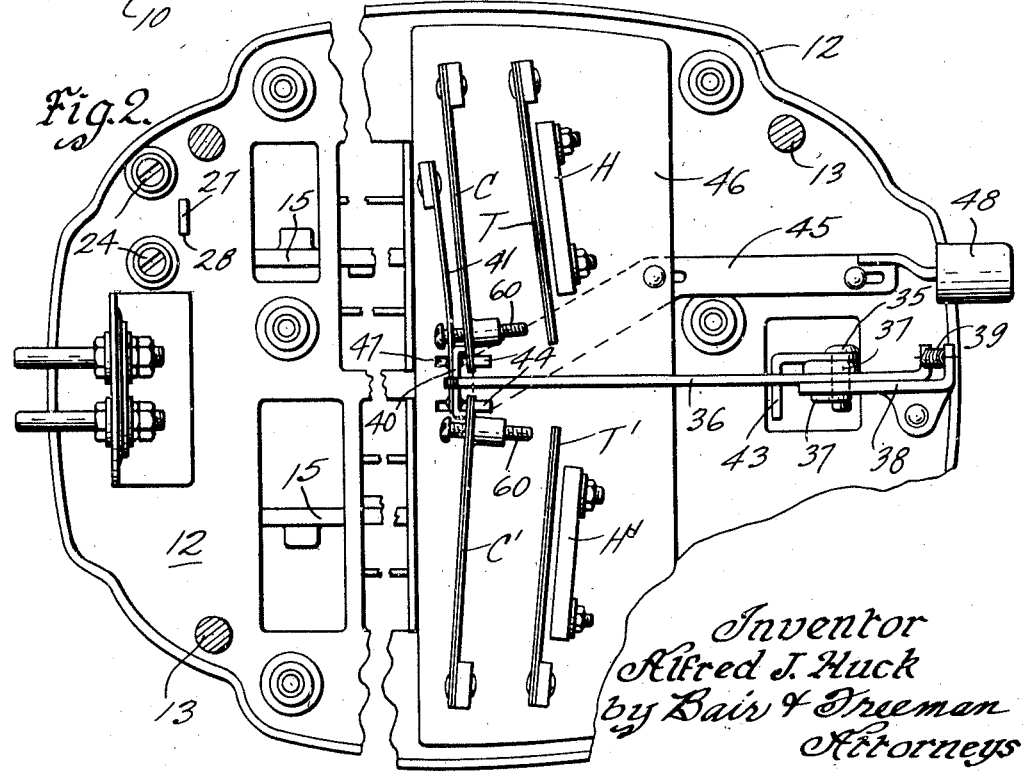
Inventor
Alfred J. Huck
by Bair & Freeman
Attorneys Nov. 14, 1944.  A. J. HUCK  2,362,753
TIMER FOR TOASTERS AND THE LIKE
Filed Dec. 31, 1942  2 Sheets-Sheet 2
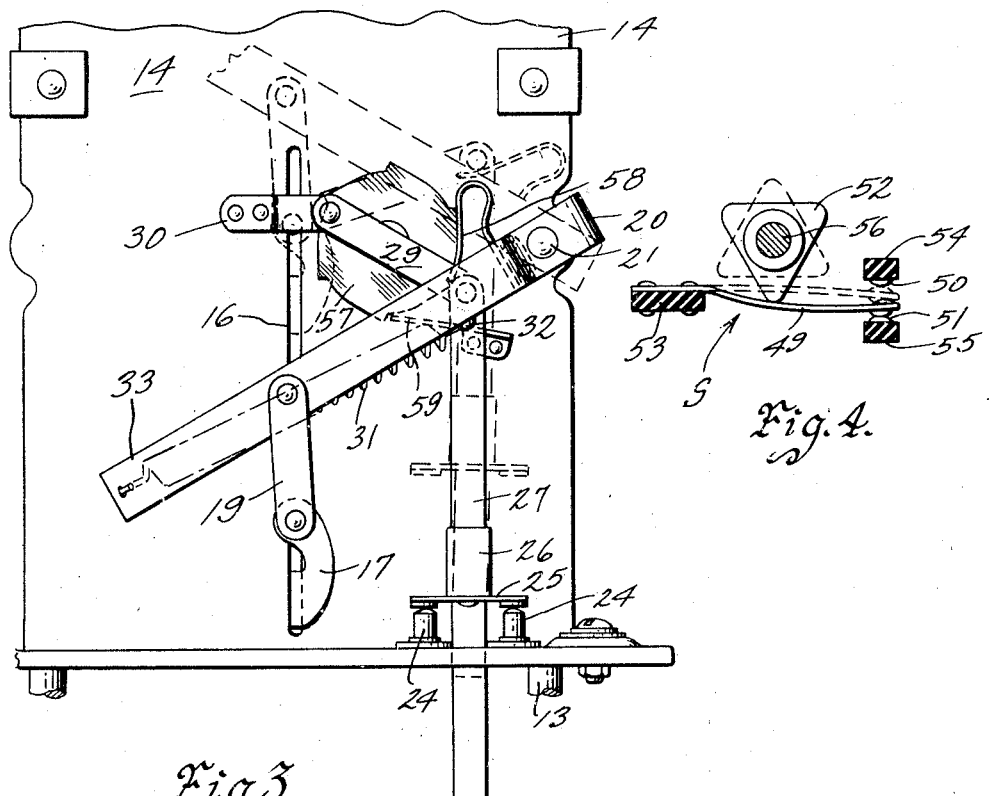
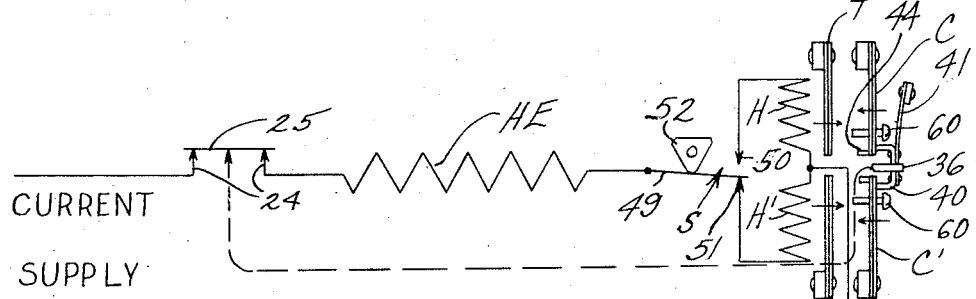
Inventor
Alfred J. Huck
by Bair & Freeman
Attorneys Patented Nov. 14, 1944

2,362,753

UNITED STATES PATENT OFFICE 2,362,753

TIMER FOR TOASTERS AND THE LIKE

Alfred J. Huck, St. Louis, Mo., assignor to Knapp-Monarch Company, St. Louis, Mo., a corporation of Missouri Application December 31, 1942, Serial No. 470,881

19 Claims. (Cl. 99—329)

My present invention relates to a timer which may be used in various types of electric appliances, it being illustrated in connection with a bread toaster.

One object of the invention is to provide thermally responsive timing means, including electric heaters, energized by closure of the circuit for the heating element of the toaster, the thermally responsive elements being alternately operable so that, during one timing cycle, one of the timing means may control the timing cycle while the other one is cooling, and then the other one may control the next timing cycle while the first one is cooling, and so on.

Another object is to provide thermal timing mechanism of this character which is simple and inexpensive to fabricate and assemble.

Still another object is to provide means for controlling the timers as to alternate operation, comprising a two-position switch which is automatically positioned, first in one position and then in the other, by ratchet mechanism operated by a bread carrier or the like when the bread carrier is depressed to a toasting position for the bread.

Still another object is to provide means to prevent over-compensation of the timers for ambient temperature rise comprising further thermally responsive elements which bear with variable pressure against stationary stops, depending upon the degree of rise of ambient temperature.

Still a further object is to provide a cam-operated auxiliary switch for controlling alternate operation of two separate timer elements during successive energizations of the toaster, the cam being operated simultaneously with successive closures of the main switch of the toaster.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Figure 1 is a side elevation of a toaster frame with the casing removed and parts broken away to conserve space on the drawings, the heating element of the toaster being omitted, and further showing the bread carrier lowered or in toasting position, and thereby the main switch closed and the timer mechanism set for operation;

Figure 2 is a sectional view on the line 2—2 of Figure 1;

Figure 3 is an end elevation of the toaster, showing the operating mechanism for the main switch and for an auxiliary switch;

Figure 4 is a sectional view on the line 4—4 of Figure 1, showing details of construction of the auxiliary switch; and Figure 5 is an electro-diagrammatic view of my timer mechanism in relation to the heating element of the toaster.

In connection with thermally or temperature responsive timer mechanisms for electrical appliances, such as toasters, it is possible to have the timer made of a bimetal bar or the like and warped by heat from an electric heater, which heater is energized by the electric current whenever it flows through the heating element of the toaster. This arrangement gives a timing period or cycle, at the end of which a main switch may be tripped to open position. A successive timing period, however, will be found shorter because of the heat remaining in the bimetal element, and because of the general ambient temperature rise in the toaster. It is desirable, therefore, to permit the bimetal element to lose at least most of the residual heat from its heater before the timer is used again to prevent too much shortening of the successive timer cycle. This is accomplished in my present arrangement by providing two timing bimetals, alternately operable.

By way of illustration, the timer mechanism has been shown applied to a toaster having a base 10 and a sub-base 12. These are connected together by posts 13. Extending from the sub-base 12 is a pair of frame plates 14 between which the usual heating elements (not shown) extend. A heating element, however, is shown diagrammatically at HE in Figure 5.

A pair of bread carrier bars 15 is slidably mounted through slots 16 in the end plates 14 and connected together by suitable means, the bread carrier bars having arms 17 and 18 to which links 19 are pivoted. The links 19 are connected with a U-shaped bar 20, pivoted at 21 to the end plates 14. By this arrangement, the ends of the bread carrier bars 15 are raised and lowered simultaneously, without binding, and in parallel relation to each other. One end of the bread carrier bars has an extension 22 terminating in a suitable, manually operable knob (not shown), and the bread carrier is adapted to be raised by a spring 23.

In the circuit of the heating element HE is a main switch comprising stationary contacts 24 and a movable bridging contact 25 (see Figures 5, 1 and 3). The contact 25 is carried by a block of insulation 26, which is secured to a slide bar 27. The bar 27 slides through an opening 28 in the sub-base 12, and has its upper end pivoted to one end of a link 29. The other end of the link is pivoted to a bracket 30 secured to one of the end plates 14.

For automatically opening and closing the main switch 24—25, I provide an over-center toggle spring 31 connected to a stud 32 on the slide bar 27, and to an extension 33 of the U-shaped bar 20. The action of this spring is to snap the switch to open and closed positions as the extension 33 is respectively raised to the dotted line position of Figure 3 and lowered to the solid line position thereof. The action of the switch is fully disclosed in my copending application Serial No. 465,361, filed November 12, 1942.

The bread carrier bars 15 are adapted to be latched in a depressed position by a latch lug 34 coacting with a latch pin 35 (see Figures 1 and 2). The latch lug 34 is formed on a latch bar 36 pivoted at 37. The pivot 37 is carried by a bracket 38. A spring 39 tends normally to unlatch the lug 34 from the pin 35.

For holding the latch bar 36 in its latched position, a clip 40, carried by a leaf spring 41, is normally constrained by the leaf spring to snap into position above the left end of the latch bar when the latch bar is depressed from the dotted position of Figure 1 to a position against a stop 42. Depression of the latch bar is effected by a flange 43 of the bread carrier bars 15 engaging the latch bar as the bread carriers are depressed to a slightly lower position than that shown in Figure 1.

When the spring 41 moves the clip 40 into position above the left end of the latch bar 36, the clip engages a pair of compensator bimetal elements C and C'. These, in turn, engage a pair of stop fingers 44 formed on a release bar 45. The release bar 45 is slidable between a mounting plate 46 and the sub-base 12, the mounting plate being provided with a pair of slots 47 for the fingers 44 to extend through. The outer end of the slide bar 44 has an operating knob 48 thereon.

For releasing the clip 40 with relation to the latch bar 36, I provide a pair of timer elements T and T', adapted to be warped by heat radiated from a pair of heaters H and H'. The heaters H and H' are adapted to be connected in the circuit of the heating element HE by a two-way auxiliary switch S. This switch includes a switch blade 49 normally engaging a contact 50, due to inherent resiliency of the switch blade, and adapted to be engaged with a second contact 51 when depressed to the full-line position of Figure 4 by a lobe of a cam 52.

The switch blade 49 and its contacts 50 and 51 are supported by insulating posts 53, 54 and 55, respectively, which, in turn, are supported on the left-hand end plate 14 in Figure 1. The cam 52 is mounted on a shaft 56 which extends through this end plate, and outside of the plate has a ratchet wheel 57 mounted thereon. The ratchet wheel is adapted to be rotated one-sixth of a turn each time the bread carrier is depressed, and for this purpose a leaf spring type of actuating pawl 58 is secured to the U-shaped lever 20. A holding pawl 59 is provided to prevent undesirable reverse rotation of the ratchet wheel 57.

The compensator elements C and C' are provided with adjusting screws 60 which constitute a factory adjustment and determine the timing period as they vary the distance that the timer bimetals T and T' must travel before contacting the adjusting screws.

*Practical operation*

In the operation of my timing mechanism, assuming that the bread carrier has been depressed as in Figure 1, the cam 52 has rotated from the dotted position of Figure 4 to the full-line position thereof. The latch bar 36 is latched by the clip 40 in its lowered position, and the main switch 24—25 is closed. Accordingly, current will flow through the heating element HE and through the heater H', as traceable in Figure 5. Accordingly, the timer bimetal T' will warp, the direction of warp due to temperature rise being indicated by a small arrow crossing it.

After a predetermined period, which may be varied by suitable mechanism, such as shown in my copending application, the timer T' will engage the adjusting screw 60 of the compensator element C', causing it, in turn, to move the clip 40 to the left in Figure 2. Finally, the clip 40 unlatches the bar 36 so that the spring 39 can raise its left end. This will release the latch lug 34 from the pin 35, thereby permitting the bread carrier bars 15 to be raised by the spring 23. The spring 31 will, adjacent the end of the upstroke, open the main switch so that the toaster is then out of operation, and ready to receive further slices of bread.

The next manual depression of the bread carrier bars will rotate the ratchet disk 57 one-sixth of a revolution, thereby positioning the cam 52, as shown by dotted lines in Figure 4, so that in this cycle of operation the heating element H is heated, and the timer element T is the one which performs the tripping operation. Thus, while the timer element T' is losing the excessive heat it received from its heater H', the timer T does the timing for this particular cycle, and, subsequently, during the next cycle, the timer T' again comes into operation, permitting the timer T to cool down. By this arrangement, successive slices of bread can be accurately toasted to the same color without permitting a time interval for the excessive heat in the timer element to dissipate, and the alternate operation of the timers T and T' is automatically assured by the pawl and ratchet mechanism operating the cam 52 for the auxiliary switch S.

In connection with the alternate timers T and T', I have found that, due to ambient temperature rise, these elements compensate for such, and shorten the timing period as the general temperature of the toaster advances. This compensation, however, is excessive, or, in other words, overcompensation is experienced. To prevent overcompensation, the compensating elements C and C', responsive to ambient temperature, are provided. These are so designed as to offer resistance to the warpage of the timers T and T', with the degree of resistance increasing as the ambient temperature rises.

Normally, the compensators C and C' are biased slightly against the stops 44. As the temperature rises, the bias increases, and, therefore, it takes more heat of the heaters H and H' to build up enough energy in the timers T and T' to overcome the tension in the compensators C and C', thereby increasing the time necessary for releasing the clip 40 from the latch bar 36. Thus, the overcompensation experienced is reduced, and the result can be controlled as desired, securing full and exact compensation, or any desired degree of over or under compensation, as necessity dictates.

In the event that the toasting is started, and it is desirable to shut off the toaster, the knob 48 may be pushed inwardly, which, through the fingers 44 and the compensators C and C', moves the clip 40 manually to unlatched position.

Some changes may be made in the construction and arrangement of the parts of my device without departing from the real spirit and purpose of my invention, and it is my intention to cover by my claims any modified forms of structure or use of mechanical equivalents which may be reasonably included within their scope without sacrificing any of the advantages thereof.

I claim as my invention:

1. In a timer for toasters and the like, a pair of timer elements adapted to be alternately energized upon successive energizations of the heating element of the toaster, a timer switch adapted to effect control of circuits for said timer elements to thereby effect such alternate energization thereof, means to simultaneously energize said heating element and move the bread to a toasting position, said means operating said timer switch to its alternate positions as said means is successively operated, said timer elements inherently over-compensating for rise of ambient temperature, and reverse acting compensating means to prevent such overcompensation comprising temperature responsive elements tending to move upon rise of ambient temperature and cooperating with said timer elements to oppose their movement during operation.

2. In a timer for bread toasters and the like, a pair of timer elements adapted to be alternately energized upon successive cycles of operation of the toaster, a timer switch adapted to effect control of circuits for said timer elements to thereby effect such alternate energization thereof, means to move the bread to a toasting position, said means simultaneously operating said timer switch to its alternate positions as said means is successively operated, said timer switch including a switch blade, a pair of contacts adapted to be alternately engaged thereby, a cam having lobes for causing said switch blade to engage the other of said contacts, ratchet mechanism for rotating said cam from said means for alternate coaction of said lobes and the intermediate positions of said cam between said lobes with said switch blade, said timer elements inherently overcompensating for rise of ambient temperature, and reverse acting compensating means to prevent such overcompensation comprising temperature responsive elements tending to move upon rise of ambient temperature and cooperating with said timer elements to oppose their movement during operation.

3. In a timer for bread toasters and the like, a pair of timer elements adapted to be alternately energized upon successive cycles of operation of the toaster, a timer switch adapted to effect control of circuits for said timer elements to thereby effect such alternate energization thereof, means to move the bread to a toasting position, said means simultaneously operating said timer switch to its alternate positions as said means is successively operated, said timer elements inherently overcompensating for rise of ambient temperature, and reverse acting compensating means to prevent such overcompensation comprising temperature responsive elements tending to move upon rise of ambient temperature and cooperating with said timer elements to oppose their movement during operation.

4. In a timer for bread toasters and the like, a pair of timer elements adapted to be alternately energized upon successive cycles of operation of the toaster, a timer switch adapted to effect control of circuits for said timer elements to thereby effect such alternate energization thereof, means to move the bread to a toasting position, said means simultaneously operating said timer switch to its alternate positions as said means is successively operated, said timer switch including a switch blade, a pair of contacts adapted to be alternately engaged thereby, a cam having lobes for causing said switch blade to engage one of said contacts and intermediate positions between said lobes for causing said switch blade to engage the other of said contacts, and ratchet mechanism for rotating said cam from said means for alternate coaction of said lobes and the intermediate positions of said cam between said lobes with said switch blade.

5. In a timer for electric appliances, a pair of timer elements adapted to be alternately energized upon successive energizations of the appliance, a timer switch adapted to effect control of circuits for said timer elements to thereby effect such alternate energization thereof, means to simultaneously energize said appliance and operate said timer switch to its alternate positions as said means is successively operated, said timer switch including a switch blade, a pair of contacts adapted to be alternately engaged thereby, a cam having lobes for causing said switch blade to engage the other of said contacts, ratchet mechanism for rotating said cam from said means so that alternate coaction of said lobes and the intermediate positions of said cam between said lobes with said switch blade takes place, said timer elements inherently overcompensating for rise of ambient temperature and reverse acting compensating means to prevent such overcompensation comprising temperature responsive elements tending to move upon rise of ambient temperature and cooperating with said timer elements to oppose their movement during operation.

6. In a timer for electric appliances, a pair of timer elements adapted to be alternately energized upon successive energizations of the appliance, a timer switch adapted to effect control of circuits for said timer elements to thereby effect such alternate energization thereof, and means to simultaneously energize said appliance and operate said timer switch to its alternate positions as said means is successively operated, said timer switch including a switch blade, a pair of contacts adapted to be alternately engaged thereby, a cam having lobes for causing said switch blade to engage one of said contacts and intermediate positions between said lobes for causing said switch blade to engage the other of said contacts, and ratchet mechanism for rotating said cam from said means so that alternate coaction of said lobes and the intermediate positions of said cam between said lobes with said switch blade takes place.

7. In a timer for installation in a circuit to be controlled, a main switch, first and second timers, an auxiliary switch therefor, means for setting said auxiliary switch alternately in opposite positions for alternately energizing said first and second timers during successive closures of said main switch, permitting only one of said timers to become energized in the circuit, said timers at the end of each timing period effecting opening of said main switch, said timers being self-overcompensating for ambient temperature rise, and means to reduce such overcompensation to a desirable degree comprising thermally responsive elements tending to move in opposite directions to the direction of movement of such timers when said thermally responsive elements respond to ambient temperature changes, stops for said thermally responsive element, their movement due to ambient temperature rise tending to effect a variation in pressure of said thermally responsive elements against said stops, depending on the degree of ambient temperature, said timers, after partial movement through their timing distances, engaging said thermally responsive elements to be opposed thereby during the remainder of their timing distances.

8. In a timer for installation in a circuit to be controlled, a main switch, first and second timers, an auxiliary switch therefor, means for setting said auxiliary switch alternately in opposite positions for alternately energizing said first and second timers during successive closures of said main switch, permitting only one of said timers to become energized in the circuit, said timers at the end of each timing period effecting opening of said main switch, said timers being self-overcompensating for ambient temperature rise, and means to reduce such overcompensation to a desirable degree comprising thermally responsive elements tending to move in opposite directions to the direction of movement of such timers when said thermally responsive elements respond to ambient temperature changes, their movement due to ambient temperature rise depending on the degree of ambient temperature, said timers, after partial movement through their timing distances, engaging said thermally responsive elements to be opposed thereby during the remainder of their timing distances.

9. In a timer for installation in a circuit to be controlled, a main switch, manual means for closing said main switch, a latch for latching said main switch in closed position, first and second timers, an auxiliary switch therefor, means operable from said manual means for setting said auxiliary switch alternately in opposite positions for alternately energizing said first and second timers during successive closures of said main switch by said manual means, said timers at the end of each timing period effecting release of said latch, said timers being self-overcompensating for ambient temperature rise, and means to reduce such overcompensation to a desirable degree comprising thermally responsive elements tending to move in opposite directions to the direction of movement of said timers when said thermally responsive elements respond to ambient temperature changes, said timers, after partial movement through their timing distances, engaging said thermally responsive elements to be opposed thereby during the remainder of their timing distances.

10. In a timer for installation in a circuit to be controlled, a main switch, manual means for closing said main switch, a latch for latching said main switch in closed position, first and second timers, an auxiliary switch therefor, means operable from said manual means for setting said auxiliary switch alternately in opposite positions for alternately energizing said first and second timers during successive closures of said main switch by said manual means, said timers at the end of each timing period effecting release of said latch.

11. In a timer for electrical appliances, a first timer adapted to be energized upon energization of the appliance, a main switch controlled thereby, a second timer adapted to be energized upon a subsequent energization of the appliance, said main switch being controlled thereby, said timers being alternately energized during successive closures of said main switch, an auxiliary switch for controlling said first and second timers to effect alternate energization thereof during successive energizations of said appliance by said main switch, and means operable by either of said timers after completion of the timing cycle to open said main switch.

12. In a timer for electrical appliances, a first timer adapted to be energized upon energization of the appliance, a main switch controlled thereby, a second timer adapted to be energized upon a subsequent energization of the appliance, said main switch being controlled thereby, said timers being alternately energized during successive closures of said main switch, an auxiliary switch for controlling said first and second timers to effect alternate energization thereof during successive energizations of said appliance by said main switch, means operable by either of said timers after completion of the timing cycle to open said main switch, said timers being inherently self-overcompensating for ambient temperature rise, and means to reduce such over-compensation to a desirable degree comprising a thermally responsive element for each timer tending to move in an opposite direction to the direction of movement of the timer when the timer and the thermally responsive element respond to ambient temperature changes, movements of said thermally responsive elements effecting opposition to the movement of said timers.

13. In a timer for electrical appliances, a first timer adapted to be energized upon energization of the appliance, a main switch controlled thereby, a second timer adapted to be energized upon a subsequent energization of the appliance, said main switch being controlled thereby, said timers being alternately energized during successive closures of said main switch, an auxiliary switch for controlling said first and second timers to effect alternate energization thereof during successive energizations of said appliance by said main switch, means operable by either of said timers after completion of the timing cycle to open said main switch, said timers being inherently self-overcompensating for ambient temperature rise, and means to reduce such over-compensation to a desirable degree comprising a thermally responsive element for each timer tending to move in an opposite direction to the direction of movement of the timer when the timer and the thermally responsive element respond to ambient temperature changes, a stop for each of said thermally responsive elements, movements of said thermally responsive elements effecting a variation in the pressure thereof against their stops, said timers, after partial movement, engaging said thermally responsive elements to be opposed thereby during further movement, and means for moving said stops to release said main switch independent of said timers.

14. In a timer for electrical appliances, a first timer adapted to be energized upon energization of the appliance, a main switch controlled thereby, a second timer adapted to be energized upon a subsequent energization of the appliance, said main switch being controlled thereby, said timers being alternately energized during successive closures of said main switch, an auxiliary switch for controlling said first and second timers to effect alternate energization thereof during successive energizations of said appliance by said main switch, means operable by either of said timers after completion of the timing cycle to open said main switch, said timers being inherently self-overcompensating for ambient temperature rise, and means to reduce such over-compensation to a desirable degree comprising a thermally responsive element for each timer tending to move in an opposite direction to the direction of movement of the timer when the timer and the thermally responsive element respond to ambient temperature changes, a stop for each of said thermally responsive elements, movements of said thermally responsive elements effecting a variation in the pressure thereof against their stops, said timers, after partial movement, engaging said thermally responsive elements to be opposed thereby during further movement.

15. A thermally responsive electric timer including a pair of thermally responsive members provided with individual electric heaters, means for supplying current alternately to said electric heaters, automatic current controlling means manually actuated simultaneously with energizations of the device being controlled by said electric timer, said electric heaters being alternately energized as said device is successively energized, automatic means operable to cut off the supply of current to said electric heaters and said device when either of said thermally responsive members is heated by its heater to a predetermined degree, said thermally responsive members being also heated by ambient temperature and thereby inherently overcompensating for rise in ambient temperature, means for preventing excessive compensation comprising reverse acting thermally responsive elements, stops therefor in positions normally spaced from said first and second thermally responsive members, said reverse acting thermally responsive elements increasing in pressure against said stops as ambient temperature rises, and being engageable by said first and second thermally responsive members after they have moved partway through their timing distances.

16. A thermally responsive electric timer including a pair of thermally responsive members provided with individual electric heaters which result in movement of said thermally responsive members when the heaters are energized, means for supplying current alternately to said electric heaters, automatic current controlling means manually actuated simultaneously with energizations of the device being controlled by said electric timer, said electric heaters being alternately energized as said device is successively energized, and automatic means operative to cut off the supply of current to said electric heaters and said device when either of said thermally responsive members is heated by its heater to a predetermined degree said timers being additionally responsive to ambient temperature and thereby inherently overcompensatory in action, and means to reduce the overcompensation thereof comprising reverse acting compensating means responsive to ambient temperature and opposing the movement of said thermally responsive members.

17. In a timer apparatus for electric appliances, a timer including two timing elements and a heater for each of said elements, a successively operable switch for alternately energizing said heaters as the electrical appliance is repeatedly energized, said timers being additionally responsive to ambient temperature and thereby inherently overcompensatory in action, and means to reduce the overcompensation thereof comprising reverse acting compensating means responsive to ambient temperature, said timers being engageable with said reverse acting compensating means after part of the movement of the timers has been completed.

18. In an apparatus for the purpose of heating a substance, a holder for the substance, a heating element for the substance, timing means operable when current flows through said heating element for controlling the position of the holder and including a pair of timers alternately operable whereby one may cool while the other is heating, said timers being self-overcompensatory in action, and means to reduce the overcompensation thereof comprising thermally responsive elements, reverse acting with relation thereto, and engageable thereby during the last part of the timing cycle of each of said timers which are thereby opposed in their movement during such last part of the timing cycle.

19. In a timer for toasters and the like, a main switch for the heating element of the toaster, a pair of timers adapted to be alternately energized and thereby moved upon successive energizations of said heating element, an auxiliary switch controlled as to alternate positions by successive energizations of said heating element, said auxiliary switch alternately energizing said timers, which, upon completion of their timing cycles, deenergize said heating element, a bread carrier connected with said main and auxiliary switches and operable upon movement to toasting position to close the main switch and change the position of said auxiliary switch, said timers being self-overcompensatory in action, and means to reduce the overcompensation thereof comprising thermally responsive elements, reverse acting with relation thereto, and engageable therewith to oppose the movement of said timer.

ALFRED J. HUCK.